Dec. 15, 1970   W. BANGSER, JR   3,547,607
BELT-GRINDER SHARPENER ASSEMBLY FOR CLOTH CUTTING MACHINE
Filed Jan. 6, 1969                           3 Sheets-Sheet 2

INVENTOR
William Bangser, Jr.
BY
ATTORNEYS

Dec. 15, 1970  W. BANGSER, JR  3,547,607
BELT-GRINDER SHARPENER ASSEMBLY FOR CLOTH CUTTING MACHINE
Filed Jan. 6, 1969  3 Sheets-Sheet 3
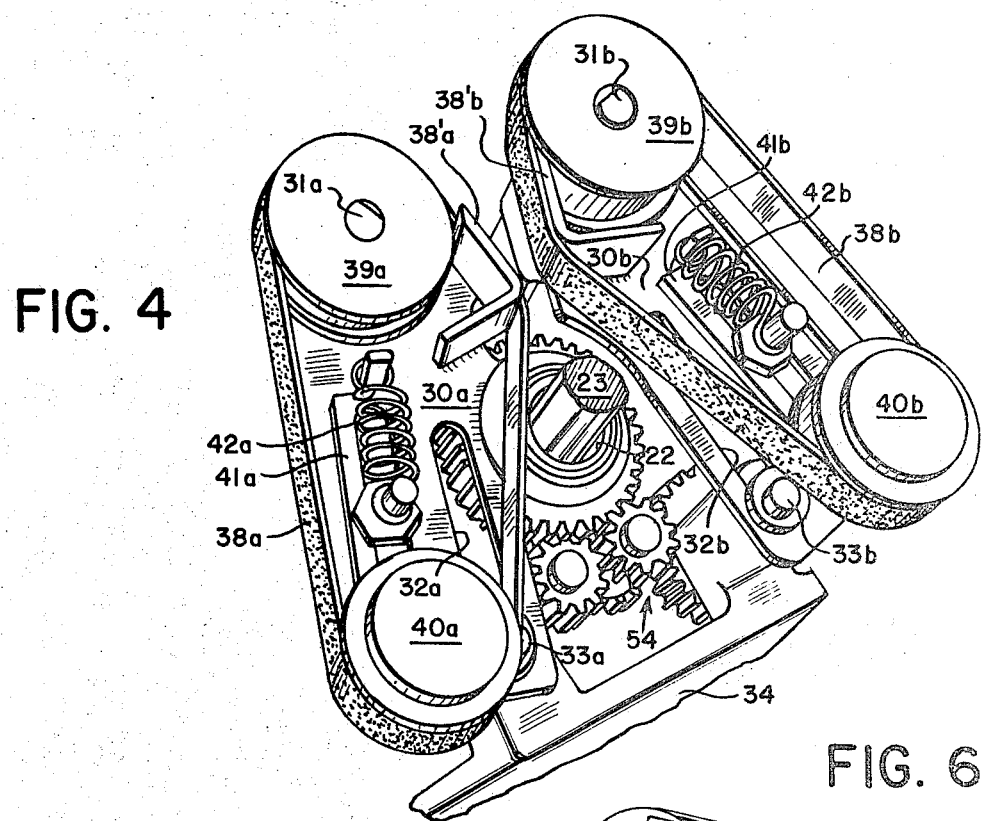
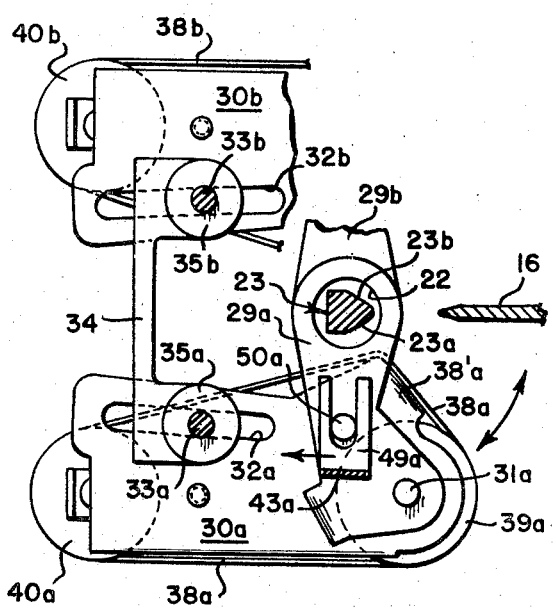
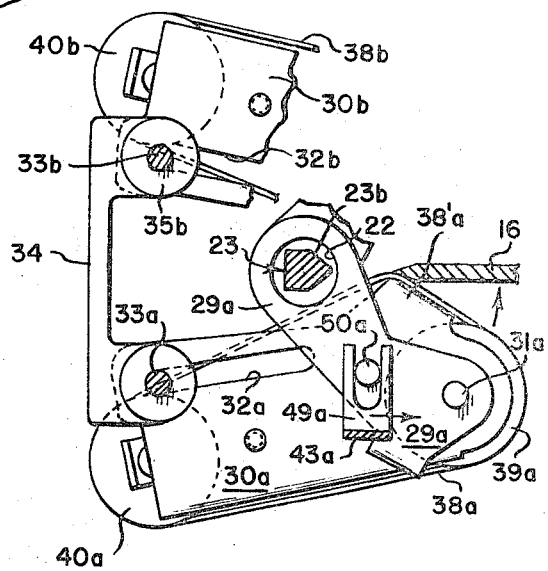
INVENTOR
William Bangser, Jr.
BY
ATTORNEYS

United States Patent Office 3,547,607
Patented Dec. 15, 1970

3,547,607
BELT-GRINDER SHARPENER ASSEMBLY FOR CLOTH CUTTING MACHINE
William Bangser, Jr., Westport, Conn., assignor to H. Maimin Co., Inc., New York, N.Y., a corporation of New York
Filed Jan. 6, 1969, Ser. No. 789,327
Int. Cl. B24b 19/00
U.S. Cl. 51—246                                                3 Claims

ABSTRACT OF THE DISCLOSURE

A belt-grinder sharpener assembly for the vertically reciprocating knife of a cloth cutting machine features a pair of mirror-image grinding belt carriers in which each carrier comprises a pair of articulated arms each pivotally mounted at its other end on a platform so that horizontal movement of the carriers away from or toward the knife simultaneously causes the grinding belts to move respectively away from or into contact with the knife.

---

This invention relates to cloth cutting machines and, more particularly, to a belt-grinder assembly for an automatic sharpener for such a machine.

In cloth cutting machines having a vertically mounted and reciprocable knife designed to cut through a large number of horizontal layers of cloth, it is standard practice to equip the machine with an automatic knife sharpener. The sharpener is normally positioned above the top of the cutting edge of the blade with its grinding wheels or belts out of contact with the knife. When the sharpener is put in motion, the carriage carrying the grinders moves downwardly to make at least one complete traverse of the length of the knife, generally while the knife is reciprocating vertically. As the sharpener carriage starts downwardly, the grinders must be moved into contact with the knife edge, and as the carriage returns to its upper inoperative position the grinders must again be moved out of contact with the knife. It will be readily appreciated that a considerable problem resides in insuring that the grinders, in spite of their ability to move into and out of engagement with the knife, make precise contact with the the knife in their sharpening position so as to provide a cutting edge with a straight and precisely shaped contour.

I have now devised a belt-grinder sharpener assembly for an automatic sharpener for a cloth cutting machine which is characterized by precise positioning of the grinding belts adjacent the knife blade when in grinding position yet is easily moved into and out of grinding contact with the knife. The belt grinder assembly of my invention comprises an assembly platform and a pair of mirror-image grinding belt carriers. Each pair of carriers consists essentially of a pair of articulated arms pivotally joined together at one end with the other end of one arm pivotally mounted on a central portion of the assembly platform and with the other end of the other arm having a longitudinally extending slot engaging a pivot pin mounted on the assembly platform outwardly and rearwardly of the first-mentioned pivotal mount on the platform. The pivotally joined ends of the arms of each pair thereof are positioned forwardly of both pivotally mounted other ends of the arms. Cam means is provided which is adapted when actuated to move the pivotally joined ends of each pair of arms rearwardly. A pulley is mounted at each end of each slotted arm, a grinding belt is mounted on the pair of pulleys on each slotted arm, and drive means is provided for rotating a pulley of each pair thereof to drive each grinding belt.

These and other novel features of the invention will be more readily understood from the following description taken in conjunction with the accompanying drawing in which FIG. 1 is a side elevation of cutting blade and blade sharpening components of a cloth cutting machine showing the belt grinder assembly of the invention;

FIG. 4 is a perspective view looking up under the assembly; and

FIGS. 5 and 6 are simplified plan view drawings of the mirror-image grinding belt carriers showing them in their inoperative and operative positions, respectively.

Figure 1:
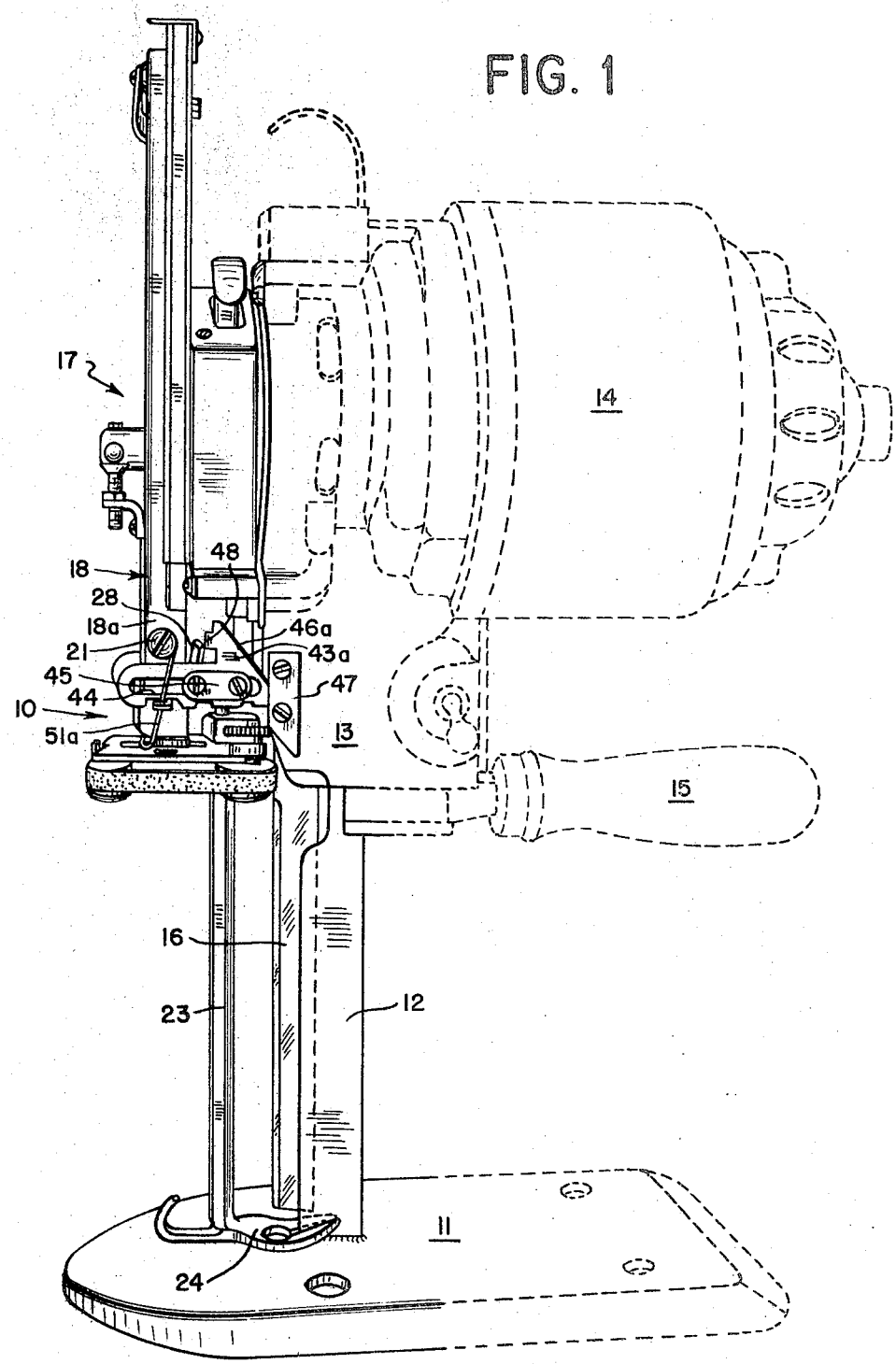

As shown in FIG. 1, the belt grinder assembly 10 is a component of a cloth cutting machine generally comprising a base plate 11, a vertical standard 12 mounted on the base plate and carrying at its top a frame 13 to which is secured a drive motor 14 and a steering handle 15. A vertical knife blade 16 is mounted in a slot in the front edge of the standard 12 and is reciprocated vertically by the motor 14 and conventional drive mechanism.

Mounted on the front end of the motor frame 13 is a conventional sharpener carriage support and drive mechanism 17. This mechanism includes a channel-shaped sharpener carriage support arm 18 which is automatically lowered and raised during the blade-sharpening cycle. The belt-grinder sharpener assembly 10 of the present invention is secured to and carried by the lower end of the carriage support arm 18.

Figure 2:
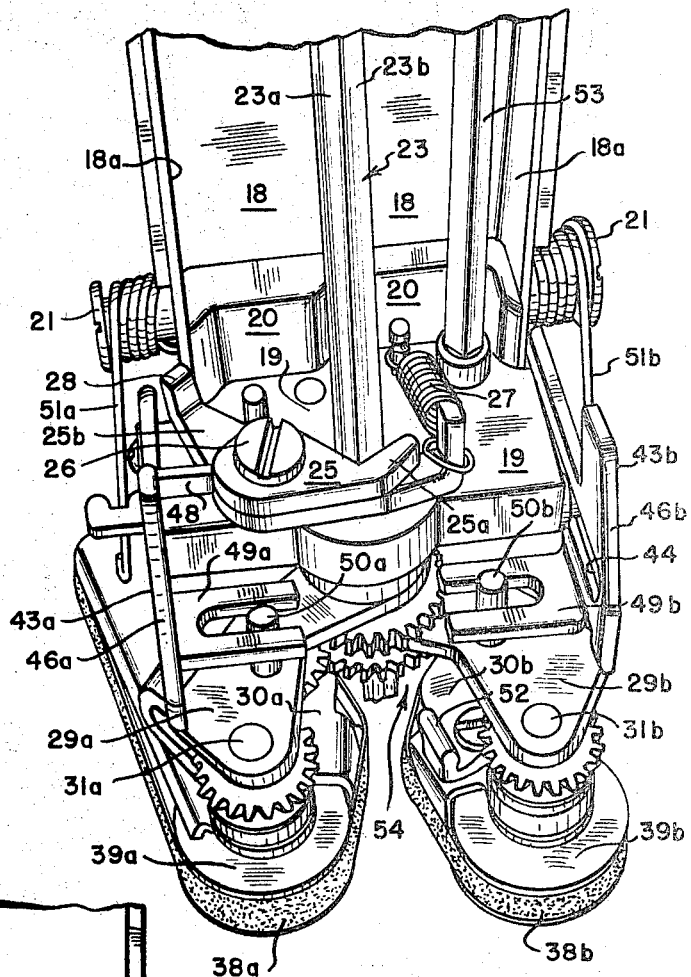
FIG. 2 is a perspective front view looking down on the belt grinder assembly from the blade position.
Figure 3:
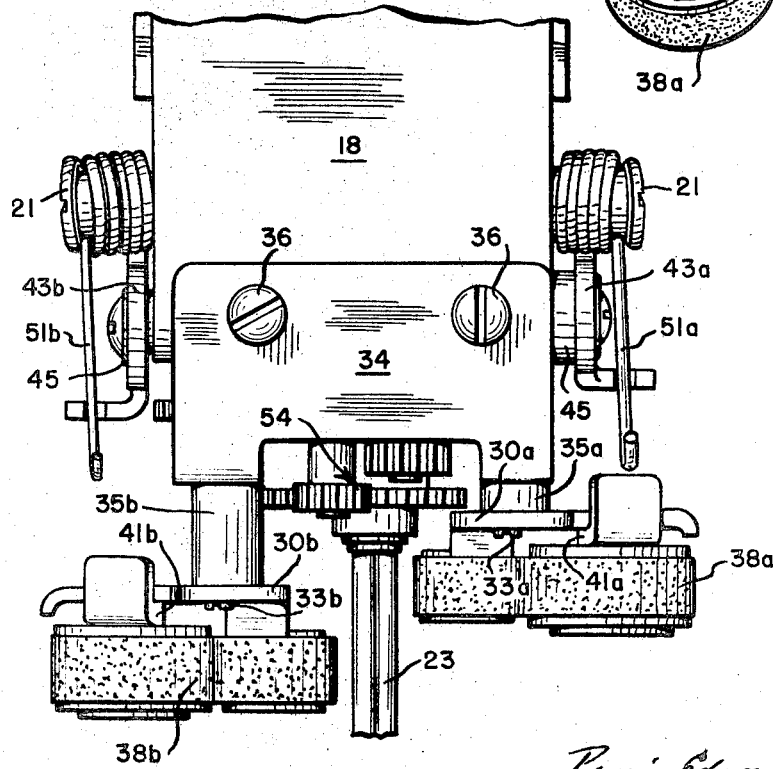
FIG. 3 is a rear elevation of the belt grinder assembly.

As shown in FIG. 2, the belt-grinder sharpener assembly is constructed around a horizontal carrier platform 19 having an upstruck rear wall 20 to the sides of which the lower end of the side walls 18a of the carriage support arm 18 is secured by screws 21. The platform 19 is provided with a central opening 22 (FIGS. 4, 5 and 6) through which extends a support rod 23 for a conventional presser foot 24. One sidewall of the presser foot support rod is provided with beveled edges 23a and 23b to form a substantially V-shaped sidewall. This sidewall of the rod 23 is engaged by a pivoted latch 25 mounted on a screw 26 secured to the top of the carriage platform 19. One arm 25a of the latch 25 is provided with a notched shape adapted to engage the V-shaped sidewall of the presser foot rod 23 and held by a spring 27 in contact with this sidewall of the rod. A second arm 25b of the latch is provided with an upstanding lug 28 by which the latch 25 can be pivoted about the screw 26 so as to move the notched arm 25a out of contact with the presser foot rod. When the notched arm 25a of the latch engages the V-shaped sidewall of the presser foot rod, it serves to hold the platform firmly in contact with the rod as the platform moves vertically along the rod during the knife-sharpening operation. However, as will be explained later, the notched arm 25a is held out of contact with the presser foot rod 23 when the sharpener is in its inoperative position so that the presser foot rod can be raised and lowered freely.

The belt-grinder sharpener assembly further includes a pair of mirror-image grinding belt carriers mounted on but below the carriage platform 19. Each carrier comprises a pair of articulated arms. The arms of one pair comprise an upper sheet metal arm 29a and a lower sheet metal arm 30a pivotally joined together by a pin 31a. The other end of the upper arm 29a is pivotally mounted on the underside of the carriage platform 19 about the axis of the presser foot rod opening 22. The other end of the lower arm 30a, as can be seen best from the underside of the assembly as shown in FIG. 4, is provided with a longitudinal slot 32a which is engaged by a pin 33a mounted on the underside of the carriage platform 19 via an intermediate mounting plate 34. Thus, the pin 33a is actually secured to a boss 35a depending from the mounting plate 34, while the mounting plate is secured to the rear face of the carriage support arm 18 by two screws 36. Horizontal movement of the lower arm 30a is made possible by providing the pin 33a with an eccentric mounting and by providing the outer face of the pin with a screw-head slot. By rotating the pin 33a, its eccentric mounting causes the lower arm to move horizontally.

The corresponding parts of the other pair of articulated arms are indicated by b, and it will now be readily appreciated that they are substantially a mirror-image of one another except that the mounting plate boss 35b is longer than the corresponding boss 35a so as to permit the two pairs of arms to be mounted in vertically spaced but parallel horizontal planes.

Each pair of grinder-belt carriers include an endless abrasive-coated grinder belt 38a or 38b mounted on forward pulleys 39a and 39b and on rearward pulleys 40a and 40b, the forward pulleys being mounted on the pivot pins 31a and 31b which pivotally join together the articulated arms of each pair. The rearward pulleys 40a and 40b are mounted at and on the other end of each of the slotted lower arms 30a and 30b, and to provide stretching tension on the belts the rearward pulleys are actually mounted on slotted sliding bars 41a and 41b which telescope with respect to the lower arms 30a and 30b and are held in tensioned and extended position by springs 42a and 42b. Suitably shaped guide plates 38'a and 38'b also depend from the undersurface of the lower slotted arms 30a and 30b and serve to support the grinder belts with the desired contour along their area of contact with the knife blade during the sharpening operation.

The pair of grinder belt carriers, by virtue of their pivotal mounting on the carrier platform 19, are capable of being moved toward or away from the knife blade. This forward and rearward action is provided by vertical cam plates 43a and 43b each having a longitudinal slot 44 which engages a supporting and guiding bushing 45 secured to each side of the carrier platform 19. The cam plates 43a and 43b have upwardly and rearwardly sloping cam surfaces 46a and 46b which are adapted to make contact with a cooperating cam actuator 47 mounted on each side of the motor frame 13 when the sharpener assembly is raised above the top edge of the knife as shown in FIG. 1.

As the grinder carriage is raised to this upper position, the cam plates 43a and 43b are forced rearwardly and a horizontal lug 48 on the cam plate 43a pushes against the upstanding lug 28 on the latch 25, thus causing the latch to pivot so as to release its contact with the presser foot rod 23. At the same time, horizontal forks 49a and 49b, struck horizontally from the lower edge of each cam plate, engage pins 50a and 50b mounted on the top of the upper belt carrier arms 29a and 29b and cause the two articulated arm assemblies to swing rearwardly and outwardly as illustrated in FIG. 5. When the belt carriage is lowered at the beginning of its operating cycle, springs 51a and 51b move the cam plates 43a and 43b forwardly as they leave the cam actuator 47. As the cam plates move forwardly, the cam plate forks 49a and 49b move the upper arm pins 50a and 50b forwardly and cause the upper carrier arms 29a and 29b to swing forwardly and inwardly about the axis of the presser foot rod 23. By comparison of the position of the upper and lower articulated arms of the belt carrier assembly in FIGS. 5 and 6, it will be readily seen that when the arms are moved rearwardly (FIG. 5) the grinder belts 38a and 38b are moved out of contact with the knife blade 16 and that when the arms are moved forwardly (FIG. 6) the belts are moved into proper grinding contact with the blade 16. This grinding contact is maintained while the belt assembly traverses the entire length of the blade. At the bottom of their travel, the lower-plane belt 38b will be below the end of the blade by the time the other belt 38a reaches the end on its side. To prevent the lower plane belt 38b from riding under the knife at this point, the lower belt carrier arm 30b is provided with an upstanding lug 52 which rides on the side of the knife 16 and holds the belt out of the way.

While the angle between the two grinding belts 38a and 38b is determined by appropriate choice of the contour of the belt guides 38'a and 38'b and by the setting of the eccentrically mounted pins 33a and 33b, this angle can be modified or swung somewhat with respect to the transverse axis of the blade by rotating either or both of the pins 33a and 33b to move either the lower arm 30a or 30b, or both, with respect to the blade. Thus, the bevel of the knife edge can be set independently on each side of the blade so as to control the length and angle of the bevel.

The belts are driven by a power shaft 53 which extends downwardly from the carriage drive mechanism and through the carriage platform 19 to a conventional planetary gear assembly 54 which drives the belt pulleys 39a and 39b regardless of their swinging motion as the articulated arms are swung forwardly or rearwardly.

It will be seen, accordingly, that the belt-grinder sharpener assembly of the present invention provides positive control over the grinding position of the belts with respect to the knife blade yet further provides simple but controlled movement of the belts out of their grinding position when the belt carriage is raised to its inoperative position.

I claim:

1. A belt-grinder sharpener assembly for sharpening the vertically reciprocable cutting knife of a cloth cutting machine which comprises an assembly platform, a pair of mirror-image grinding belt carriers, each pair of carriers consisting essentially of a pair of articulated arms pivotally joined together at one end with the other end of one arm pivotally mounted on a central portion of the assembly platform and with the other end of the other arm having a longitudinally extending slot engaging a pivot pin mounted on the assembly platform outwardly and rearwardly of the first-mentioned pivotal mount on the platform, the pivotally joined ends of the arms of each pair thereof being positioned forwardly of both pivotally mounted other ends of the arms, cam means adapted when actuated to move the pivotally joined ends of each pair of arms rearwardly, a pulley mounted at each end of each slotted arm, a grinding belt mounted on the pair of pulleys on each slotted arm, and drive means for rotating a pulley of each pair thereof to drive each grinding belt.

2. A belt-grinder sharpener assembly according to claim 1 in which the cam means is mounted adjacent each side of the assembly platform for horizontal movement thereon and each cam means is provided with a horizontally disposed slotted fork adapted to engage the first-mentioned of the articulated arms and to move the pivotally joined ends of each pair of arms rearwardly when the cam means is moved rearwardly.

3. A belt-grinder sharpener assembly according to claim 1 in which the pivot pin for each slotted arm is eccentrically mounted so that each slotted arm can be moved horizontally to control the angle and size of the sharpening cut on the blade.

References Cited

UNITED STATES PATENTS

| | | | |
|---|---|---|---|
| 2,753,670 | 7/1956 | Carapucci | 51—246 |
| 3,350,818 | 11/1967 | Clark | 51—246 |

WILLIAM R. ARMSTRONG, Primary Examiner